United States Patent [19]

Bray

[11] Patent Number: 4,871,205

[45] Date of Patent: Oct. 3, 1989

[54] VEHICLE FINISH PROTECTION APPARATUS

[76] Inventor: Charles E. Bray, 3750 Arville St., #418, Las Vegas, Nev. 89103

[21] Appl. No.: 206,505

[22] Filed: Jun. 14, 1988

Related U.S. Application Data

[63] Continuation-in-part of Ser. No. 62,075, Aug. 15, 1987, abandoned.

[51] Int. Cl.⁴ .............................................. B60R 13/02
[52] U.S. Cl. ...................................... 293/128; 428/31
[58] Field of Search ................ 293/128, 120; 280/770; 428/31

[56] References Cited

U.S. PATENT DOCUMENTS

| | | | |
|---|---|---|---|
| 2,675,983 | 4/1954 | King | 248/226 |
| 2,994,356 | 8/1961 | Fleming | 150/52 |
| 3,147,176 | 9/1964 | Haslam | 161/39 |
| 3,367,702 | 2/1968 | Sauer | 293/62 |
| 3,472,546 | 10/1969 | Samuels | 293/1 |
| 3,582,134 | 6/1971 | Shaff | 296/146 |
| 3,610,669 | 10/1971 | Morrissey, Sr. | 293/62 |
| 3,882,574 | 5/1975 | Martinez | 24/73 B |
| 4,002,363 | 1/1977 | James | 293/62 |
| 4,014,583 | 3/1977 | Forbes | 293/62 |
| 4,127,294 | 11/1978 | Cooper | 293/62 |
| 4,401,331 | 8/1983 | Ziner et al. | 293/128 |
| 4,707,008 | 11/1987 | Falco | 293/128 |
| 4,707,009 | 11/1987 | Barnett | 293/128 |
| 4,726,614 | 2/1988 | Myers et al. | 293/128 |

Primary Examiner—Robert R. Song
Attorney, Agent, or Firm—Charles E. Cates; Richard G. Harrer

[57] ABSTRACT

Vehicle finish protection apparatus is disclosed which is adapted for temporary installation on a vehicle when the vehicle is parked closely adjacent another vehicle and is therefore susceptible to finish damage as a result of the edge of a door of the adjacent vehicle impacting against the side of the vehicle to be protected. The vehicle finish protection apparatus includes unitary first and second elongated sections, triangular in cross sections joined by a living hinge such that the first and second elongated sections are normally aligned in an operational configuration, but may be folded together at the hinge to effect a compact storage configuration. The means for securing a hinge are on separate faces of the sections so that one section can be swung up and away and back on itself with one hand for easy use in tight spaces. Each of the first and second elongated sections includes magnets distributed along its length to facilitate removably affixing the apparatus to the side of a vehicle by magnetic attraction. Alternatively, the magnets may comprise a plurality of discrete spaced-apart units or a continuous flexible strip of magnetic material. An anti-theft element is fixed to one of the elongated sections and includes an outwardly extending hook portion adapted to engage a vehicle door edge to be retained thereby when the vehicle door is closed. A double bight with a break-away bight for adaption to an dfrom 2-door to 4-door use is provided. The elongated sections are each fabricated from a resilient, flexible closed cell material, such as polyethylene, urethane, rubber foam, EDPM foam and neoprene foam characterized by densities of 1.5 to 5.0 p.c.f. and a water absorption value of less than 1%, and preferably the hinge is also fabricated from the same material and in such a manner that the elongated sections and the joining hinge are unitary.

17 Claims, 2 Drawing Sheets

U.S. Patent  Oct. 3, 1989  Sheet 1 of 2  4,871,205
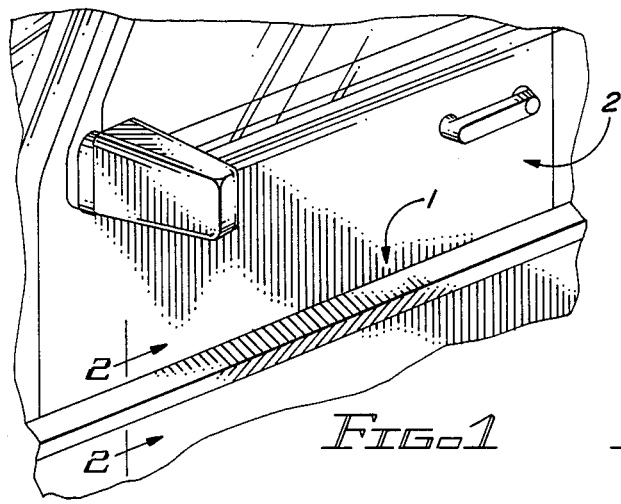
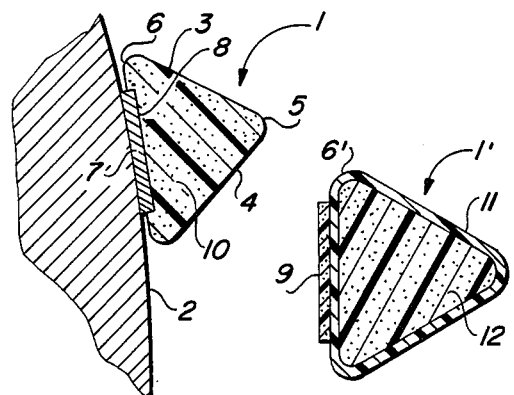
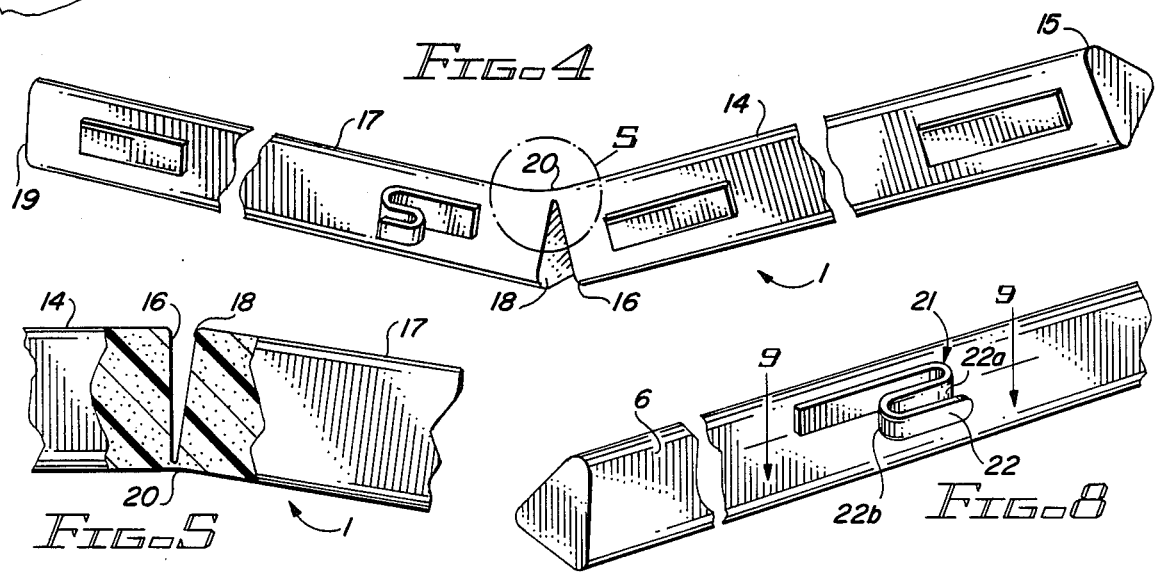
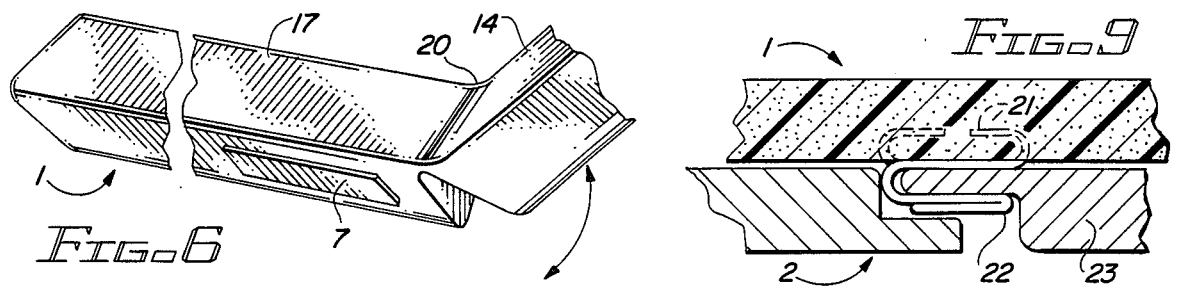
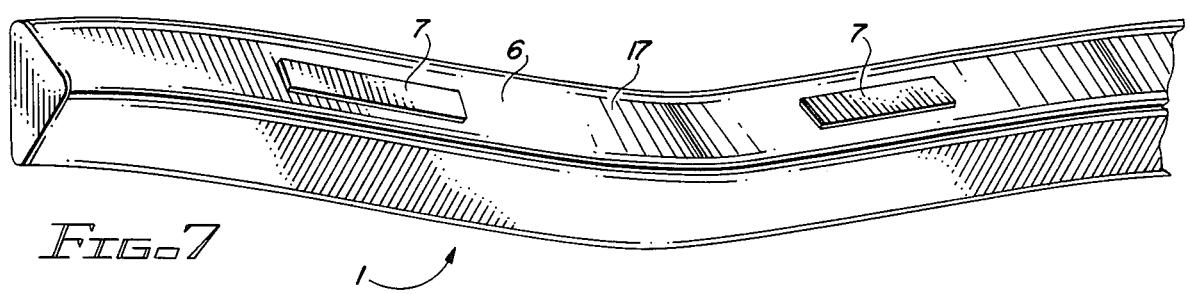

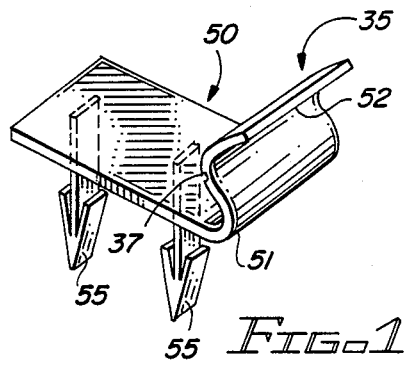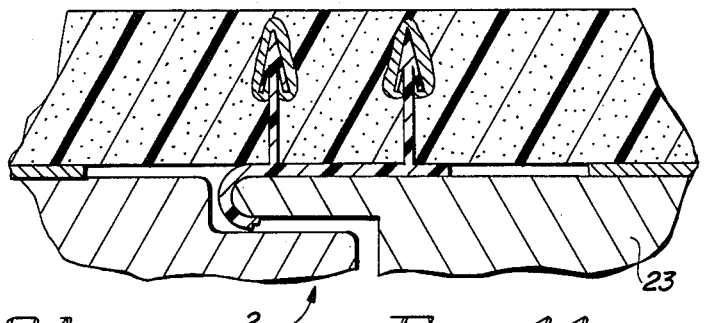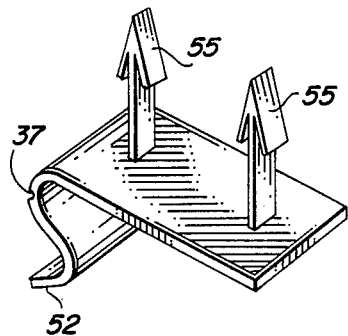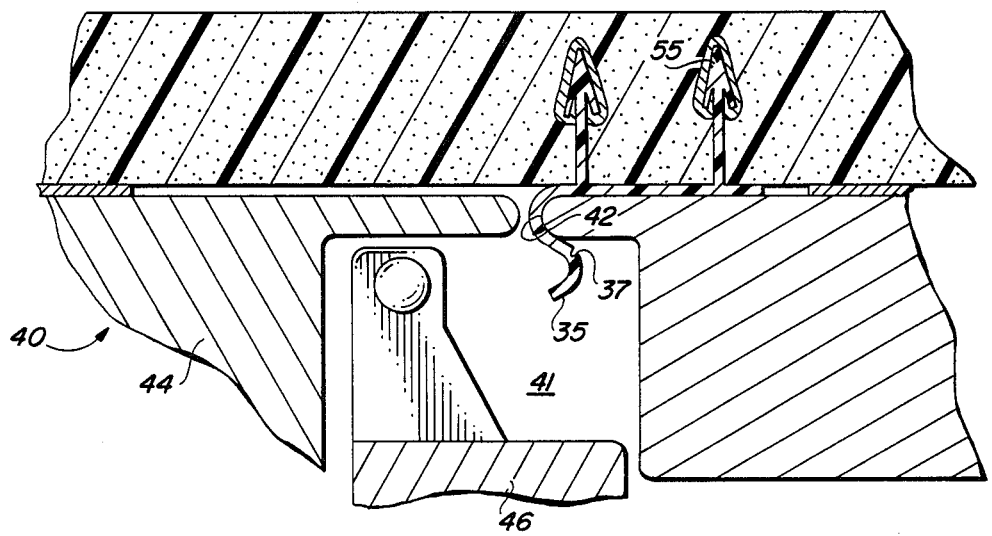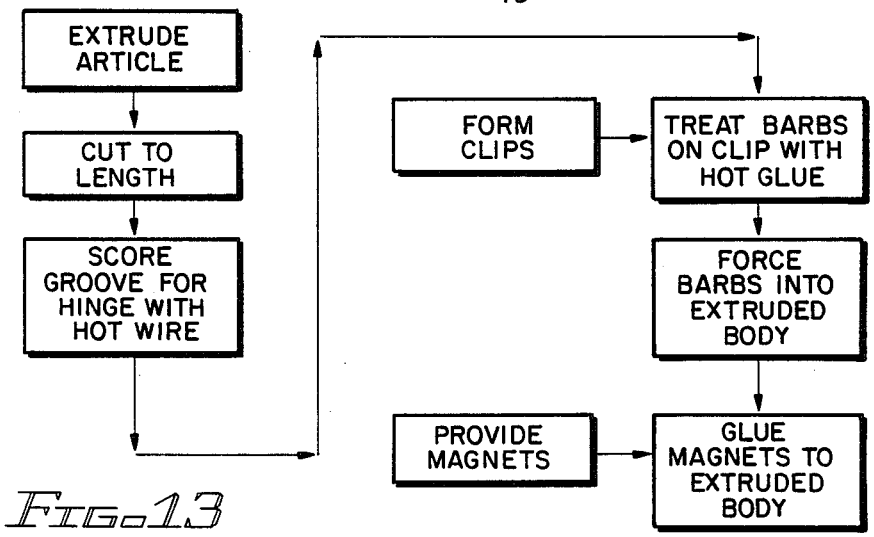

VEHICLE FINISH PROTECTION APPARATUS

This is a continuation-in-part of application Ser. No. 06/062,075, filed 08/15/87, and abandoned upon the filing of this application.

FIELD OF THE INVENTION

This invention relates to the vehicular arts, and more particularly, to temporarily emplaceable vehicle finish protection apparatus adapted to prevent finish damage as a result of the edge of a door of an adjacent vehicle impacting against the side of a vehicle to be protected.

BACKGROUND OF THE INVENTION

The potential for damage to the exterior finish of a vehicle parked closely adjacent another vehicle as a result of the edge of a door of such adjacent vehicle impacting against the side of the subject vehicle is so notoriously well-known as to be virtually a universal annoyance. Finish damage of this class is characterized by a small local dent as well as damage to the paint surface which is often chipped and/or abraded. These damaged areas have come to be known as "dings", and their cumulative effect not only brings about an unsightly appearance to the side of a vehicle, but also is a substantive source for reducing the value of the vehicle.

Generally, there have been two approaches in the prior art to attempting to limit or prevent the occurrence of "dings". First, permanent guard strips have been provided along the length of a vehicle in the area most susceptible to this type of damage, the protective strip being made of a resilient material and extending slightly outwardly from the vehicle surface. These so-called molding strips, which many vehicle owners believe detract from the appearance of the vehicle, are of limited effectiveness in carrying out their intended purpose. Frequently, for example, an adjacent vehicle will have a door contour that, when its door edge swings into another vehicle, does not align with the protective molding (if provided) of the impacted vehicle and therefore imparts a "ding" to that vehicle in spite of the molding strip.

A second approach has been the provision of temporary protection apparatus to be emplaced by a vehicle user whenever his vehicle is parked in such close quarters to adjacent vehicles as to be in danger of being impacted when a door of an adjacent vehicle is opened. The known prior art devices of the temporarily emplaceable type each have one or more drawbacks which include: difficult to install and/or remove, very cumbersome, difficult to store when not in use, not durable, easily stolen, ineffective, and/or expensive to fabricate.

My invention is a vehicle finish protection apparatus which falls into the temporarily emplaceable category, but which suffers from none of the drawbacks enumerated above.

OBJECTS OF THE INVENTION

It is therefore a broad object of my invention to provide improved vehicle finish protection apparatus.

It is another object of my invention to provide such vehicle finish protection apparatus which is temporarily emplaceable on the side of a vehicle to be protected and which is exceptionally successful in performing its intended function.

It is yet another object of my invention to provide such vehicle finish protection apparatus which is compact and which is simple to store, install and remove.

It is still yet another object of my invention to provide such vehicle finish protection apparatus which is economical to fabricate, but which is durable in extended use.

In other aspects, it is an object of my invention to provide such vehicle finish protection apparatus which will not mar the finish of the vehicle with which it is employed and which has an anti-theft feature to prevent its unauthorized removal from the vehicle on which it has been temporarily emplaced.

SUMMARY OF THE INVENTION

These and other objects of my invention are achieved by a vehicle finish protection apparatus adapted for temporary installation when a vehicle is parked closely adjacent another vehicle and is therefore susceptible to finish damage as a result of the edge of a door of such adjacent vehicle impacting against the side of the vehicle to be protected. The vehicle finish protection apparatus is a single piece extrusion of closed cell polyethylene having a density of about one and one-half to five pounds per cubic foot per ASTM 1667, a water absorption value of less than one percent by volume or weight per ASTM C-272. The polyethylene extrusion is scored by a hot wire to a suitable depth to create a living hinge of the same material, thus creating first and second elongated sections joined by a hinge such that the first and second elongated sections are normally aligned in a deployed, operational configuration, but may be folded together at the hinge to effect a compact storage configuration. The extrusion is triangular in the preferred embodiment and the hinge is on a side other than the side whose surface is against the vehicle body. This permits one of the elongated sections to swing away from the vehicle body without scraping the side to which it is attached. Each of the first and second elongated sections includes magnets distributed along its length to facilitate removably affixing the finish protection apparatus to the side of a vehicle by magnetic attraction. Alternatively, the magnets may comprise a plurality of discrete spaced-apart units or a continuous flexible strip of magnetic material. An anti-theft element is fixed to one of the elongated sections and includes an outwardly extending hook portion adapted to engage a vehicle door edge to be retained thereby when the vehicle door is closed. The elongated sections are each fabricated from a resilient, flexible material, and preferably the hinge is also fabricated from the same material and in such a manner that the elongated sections and the joining hinge are unitary. Preferably the hook is made of plastic and has a double bight. The hook is scored so that if the hook is used with a 2-door car the second bight will be broken away at the score line to automatically adapt to the 2-door configuration; however, if used on a 4-door model the double bight serves to prevent the removal of the hook from the 4-door which has extra space behind the front door.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a fragmentary view of the side of a vehicle illustrating my invention temporarily emplaced to protect the vehicle finish;

FIG. 2 is a cross sectional view taken along the lines 2—2 of FIG. 1 to illustrate the internal and magnetic securement features of my invention;

FIG. 3 is a cross sectional view of an alternative embodiment of my invention;

FIG. 4 is a partially cutaway view of my invention illustrating an intermediate hinge feature which facilitates storage of the apparatus when it is not in use;

FIG. 5 is a view in the region indicated at 5 of FIG. 4 and more particularly illustrating the preferred structure of the hinge region;

FIG. 6 is a partially cutaway back view of my invention illustrating a magnetic engagement feature of the invention and also illustrating the manner in which it may be folded for storage about the hinge region;

FIG. 7 is a partial view of my invention particularly illustrating one distribution for securement magnets spaced-apart along its length and also indicating the flexibility of the apparatus;

FIG. 8 is a partially cutaway and partially phantom view illustrating an anti-theft feature of my invention; and FIG. 9 is a cross sectional view taken along the lines 9—9 of FIG. 8 and illustrating the manner in which my invention may be secured against theft through the cooperation of the anti-theft feature and the door of a vehicle on which my invention is temporarily emplaced.

FIGS. 10A and 10B are perspective views of the presently preferred plastic hook;

FIG. 11 is a view of the hook of FIG. 10 adapted for use in a typical 2-door vehicle;

FIG. 12 is a view of the hook of FIG. 10 in use in a typical 4-door vehicle; and FIG. 13 is a flow chart showing the steps of manufacturing the apparatus.

DETAILED DESCRIPTION OF THE INVENTION

Referring now to FIG. 1, the subject vehicle finish protection apparatus 1 is illustrated as it has been temporarily emplaced along the side of a vehicle 2. It will be appreciated that the overall length of the finish protection apparatus 1 may be established as appropriate to effectively prevent damage to the finish of a given vehicle with which it is used. Preferably, the finish protection apparatus is at least the length of two automobile doors, and, for certain vehicles it may be desirable to make its length essentially as long as the vehicle itself. It will also be appreciated, of course, that a second finish protection apparatus 1 (not shown in FIG. 1) is normally deployed on the opposite side of the vehicle 2 to provide corresponding finish protection on that side against damage from engagement with the edge of a door of an adjacent vehicle on that side.

While the cross section of the vehicle finish protection apparatus 1 may have any appropriate shape, I presently prefer the employment of a triangular solid (or tubular) cross section as particularly illustrated in FIGS. 2 and 3. Thus, referring specifically to FIG. 2, when the finish protection apparatus 1 has been temporarily emplaced on the vehicle 2, triangle sides 3, 4 meet at an outwardly directed apex 5 which is sufficiently spaced from the surface of the vehicle 2 as to reliably intercept any door edge from an adjacent vehicle which may be swung toward the side of the vehicle 2. The remaining side 6 of the finish protection apparatus 1 carries a magnet 7 (which may be one of a series) which is preferably adhesively secured in a recessed pocket 8 provided for that purpose in the side 6 of the finish protection apparatus 1 facing the surface of the vehicle 2.

Attention is briefly directed to FIG. 3 in which an alternative configuration for supporting the magnetic structure employed to hold the finish protection apparatus on prime against the side of a vehicle is shown. More particularly, the magnetic structure 9 carried on the inwardly directed side 6' of the finish protection apparatus 1' is a thin strip impregnated with magnetic particles and which may be of the type provided with adhesive along one side to permit its being readily affixed to the side 6'. In the case of using the discrete magnet 7 (FIG. 2), the magnet 7 is preferably coated or covered in a manner which will prevent its marring the surface of the vehicle 2 when in use. In the case of the magnetic strip 9 (FIG. 3), no such coating is required since the magnetic particles are embedded in soft material which is inherently non-marring. In a particularly preferred embodiment the protection apparatus is constructed of closed cell polyethylene. This material, I have discovered, is ideally suited to the requirements of a vehicle protection apparatus. It is flexible, has a memory to restore it to its shape after bumping, it can be manipulated by hand to assume configurations desired to best protect a particular body shape in view of conditions to be protected against (e.g., a van, truck, or other vehicle whose doors might be opened against the vehicle sides in particular places), it will hold the lines, whether straight or curved, imposed by the user, it retains its flexibility in both hot and cold climates (from about −90 degrees F. to about +212 degrees F.), has excellent resistance to ultra violet ray damage, and the apparatus made of closed cell polyethylene is sufficiently light-weight (about 4 oz. per vehicle side in 2 inch width extrusion) to be manipulated with one hand by a person with an arm full of purchases and by handicapped persons. Another excellent quality of polyethylene for this use is that a single continuous extrusion can be deeply scored by a hot wire to make the living hinge for folding. Plastic materials useful in the invention, at densities between about 1.5 to 5.0, preferably between 1.5 and 3.0, and ideally about 2.0, pounds per cubic foot, and having water absorption values of less than 1% measured either by volume or by weight, by the test methods first mentioned above, are selected from closed cell polyethylene, flexible urethane, rubber foam, EPDM foam and neoprene foam.

The apparatus of this invention offers the advantages of low cost, ease of manufacture, high impact resistance, durability, practicality and simplicity. The manufacturing steps are to extrude a six foot length of polyethylene, score a ⅛ inch wide groove, leaving sufficient connecting material to make the living hinge, attach four 3″ magnets with hot glue, (for example, an ethylene vinyl acetate made by Parker Manufacturing Co., Northboro, Mass. , attach the anti-theft clip by dipping its barb in hot glue and pushing the barb into the body of the extrusion, which causes the polyethylene to melt and form around the barb. The glue assists in holding the barb in place in the body of the apparatus. The completed apparatus may then be packaged for the consumer. Labor costs are low because no sophisticated or expensive machinery other than the plastic molding and extruding machines are required in the process.

FIGS. 2 and 3 also illustrate variant approaches to the principal material from which the finish protection apparatus 1, 1' may be fabricated. As will be discussed more fully below, the finish protection apparatus should be flexible and resilient along its length in order to both elastically absorb any blows from the door edges of adjacent vehicles and also to conform readily to the contours of various vehicles. Thus, as shown in FIG. 2, the finish protection apparatus may be fabricated principally from a soft foam interior material 10. Alternatively, as shown in FIG. 3, the finish protection apparatus 1' may be fabricated from an appropriate resilient flexible material 12 covered with an outer skin 11 of a tougher material such as vinyl. With either variant, it will also be appreciated that a hollow central core may be provided if desired.

Turning now to FIG. 4, it may be seen that the subject vehicle finish protection apparatus 1 includes a first elongated section 14 (having a first end 15 and a second end 16) and a second elongated section 17 (having a first end 18 and a second end 19). The relative positions of hinge opening hook and magnets are suitable for the driver's side of the vehicle. A mirror image configuration is provided for the passenger's side. Referring simultaneously to FIGS. 4 and 5, the second end 16 of the first elongated section 14 is joined to the first end 18 of the second elongated section 17 at a hinge region 20. Preferably, the hinge region 20 is simply an extension of the resilient flexible material from which the elongated sections 14, 17 are fabricated along the edge of the finish protection apparatus adjacent to the face abutting the exterior of a vehicle to which the apparatus is temporarily attached. The purpose of the hinge 20 is to facilitate storage by folding the apparatus at the hinge until the two elongated sections 14, 17 are juxtaposed to provide a relatively compact storage configuration, and subsequently for ease of attachment to the door in the folded position. This feature is further illustrated in FIG. 6 which shows the first and second elongated sections 14, 17 being folded together and also illustrates one of the discrete, spaced apart magnets 7 which are distributed along the lengths of each of the first and second elongated sections to hold the finish protection apparatus 1 in place against a vehicle when the apparatus is in use.

As previously indicated, it is desirable that the finish protection apparatus 1 be sufficiently flexible as to accommodate itself to the contours of variously shaped vehicles with which it may be used. This flexibility is illustrated in FIG. 7 which also shows in more detail the discrete, spaced apart magnets 7 distributed along the length of the elongated section 17, it being understood that a corresponding plurality of discrete, spaced apart magnets extend along the length of the first elongated section (not shown in FIG. 7). Alternatively (as shown in FIG. 3), a continuous flexible strip of magnetic material 9 extends along the respective lengths of the first and second elongated sections 14, 17 on the side 6 which abuts the vehicle exterior when the apparatus is deployed for use.

As will be discussed further below, the vehicle finish protection apparatus of the subject invention is intended to be temporarily installed when the vehicle with which it is to be used is parked in an area susceptible to damage from opening the doors of closely adjacent vehicles. Such environments, as is notoriously well known, render valuable and accessible objects, such as the protection apparatus itself, subject to being stolen. However, an effective anti-theft feature is incorporated into the subject vehicle protection apparatus to prevent such theft.

Thus, referring to FIGS. 8 and 9, intermediate along the length of one of the first surface of an elongated sections 14 or 17, there is provided an anti-theft device 21 fixed to the elongated section (by embedding, stapling, adhesive, or any other effective means), and the anti-theft device 21 includes a hooked portion 22 extending outwardly from the surface 6 which faces the vehicle surface when the apparatus 1 is installed. The purpose of the hook portion 22 of the anti-theft device 21 may best be appreciated with reference to FIG. 9. Thus, the hook portion 22 may be engaged with the edge of one of the vehicle doors (typically the front door of a four-door vhicle) while the door 23 is slightly open. Note that hook 22 has double bights 22(a) and 22(b) which are markedly superior to a single bight hook in protecting the device from theft when installed in a 4-door vehicle. When the door 23 is closed and locked, the anti-theft device 21 is captured securely as illustrated in FIG. 9, thus preventing the finished protection apparatus 1 from being stolen by simply pulling the magnetic attraction means away from the surface of the vehicle. The hinge means joins a second surface adjacent to said first surface. The use of the preferred embodiment plastic hook 50 made of ABS is shown in FIG. 12 with reference to a 4-door model 40. Typically a 4-door vehicle 40 has extra space 41 (compared to a 2-door model) between the front door edge 42 and the post 46 due to the design requirement of leaving space for the rear door 44 to swing to the open position. A single bight hook can be twisted out of engagement with a 4-door vehicle door; however, the double bight 35 prevents such removal. The score line 37 in the double bight permits the second bight to be broken away for use in a 2-door vehicle 2 which does not have enough space to accommodate the second bight. If the bight is metal, as shown in FIGS. 1-9, the door can be closed against the bight to compress it to fit as shown in FIG. 9. The same treatment will break off the second bight in the plastic embodiment. The two bight feature for the 4-door makes it possible to use a short clip base adjacent the body of the vehicle. Inasmuch as a clip of some sort must be used to secure any side protection device, and the clip is a potential means of marring one's own vehicle as the result of a direct hit by another vehicle's door, it is useful to have the smallest possible target for a hostile door.

Consider now the manner in which the subject vehicle protection apparatus may be used and stored. When the vehicle which is to have its finish protected has been parked, one or both vehicle finish protection apparatus of a pair typically used with a given vehicle may be installed. The finish protection apparatus 1 is taken from its storage place. A door. (typically the front door of most vehicles) is slightly opened to permit engaging the hook portion 22 of the anti-theft device 21 to the edge of the door 23, and the door is then closed to achieve the anti-theft status illustrated in FIG. 9. The apparatus is unfolded along the hinge 20 to bring the first and second elongated sections 14, 17 into a normal alignment for the deployed configuration. The relationship of hook, magnets and hinge is such that after the anti-theft device is secured by the door the second elongate section may be folded in an upward and outward direction and extended to engage the vehicle side, in which position the two sections 14, 17 are in line. The two elongated sections 14, 17 then extend fore and aft the vehicle and are held in place by the magnets 7 or magnetic strip 9 as may be have been selected in the manufacture of a given example of the finish protection apparatus. While the vehicle finish protection apparatus 1 is thus deployed, the sides of the vehicle are effectively protected against being damaged as a result of impact from the door of an adjacent vehicle. Upon the return of the driver to remove the vehicle, the door 23 capturing the hook portion 22 of the anti-theft device 21 is unlocked and slightly opened to permit disengaging the anti-theft device 21 from the door edge. Then, the elongated sections 14, 17 may be removed by simply pulling them away to overcome the magnetic attraction to the vehicle surface. For storage, the two elongated sections may be folded in juxtaposition at the hinge 20 to effect a compact storage unit which may be placed in the trunk or other suitable position within the vehicle to await its next use.

Turning now to FIG. 10, the hook 50 is made of ABS plastic and has a groove 37 scored between the first 51 and second 52 bights. The purpose is to provide a breaking point for converting the hook 50 from 4-door use to 2-door vehicle use. The second bight 52 may be removed before use or by closing the door of the 2-door vehicle after the hook 50 is in place which will break off the second bight. The hook 50 is shown in use in 2-door and 4-door vehicles in FIGS. 11 and 12.

A particularly useful embodiment of extrusion has sides with angles other than 90 degrees, for example triangular or hexagonal, so that the magnets and anti-theft device can be placed on one surface and the hinge can be placed on an adjacent surface. The advantage is that one section can be pulled away from the vehicle with one hand, folded up and away (e.g., at an angle of 45 degrees from horizontal) and folded back on the second segment. The two segments are then half the length and easily managed with one hand (which may be necessary if one arm is carrying packages). The 45 degree angle of travel makes the operation convenient even if another vehicle is parked very close by.

The method of manufacturing a product according to this invention is shown in FIG. 13 wherein the basic steps are recited. The steps are: extrude article, cut to length, score groove to create living hinge with hot wire, treat barbs 55 on clip with hot glue, form clips, force barbsinto extruded body, glue magnets to extruded body. The use of the hot wire to score the extrusion creates a living hinge 20 made of the same material as the body of the extrusion so that sections and hinge means form a unitary apparatus. The hinge is ordinarily stronger than the sections after the hot wire operation. The slit made by the hot wire is narrow, on the order of ⅛ inch, and thus the living hinge side presents a continuous one-piece appearance to the eye, and the whole apparatus presents a continuous line of protection against the doors of neighboring vehicles. After the processing steps the resulting product may be suitably packaged for distribution to the consumer.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. Vehicle finish protection apparatus adapted for temporary installation when a vehicle is parked closely adjacent another vehicle and is therefore susceptible to finish damage as a result of the edge of a door of such adjacent vehicle impacting against the side of the vehicle to be protected, said finish protection apparatus having a unitary body comprising:
    (A) a first elongated section having first and second ends;
    (B) a second elongated section having first and second ends;
    (C) said first and second elongated sections each being fabricated from a resilient, flexible material;
    (D) first magnet means distributed along the length of said first elongated section;
    (E) second magnet means distributed along the length of said second elongated section;
    (F) living hinge means coupling said second end of said first elongated section to said first end of said second elongated section such that said first and second elongated sections are normally aligned in a deployed configuration in use, but may be folded together at said hinge means to effect a storage configuration; and
    (G) anti-theft means fixed to one of said elongated sections, said anti-theft means including an outwardly extending hook portion having a double bight adapted to engage a vehicle door edge and be retained thereby when the vehicle door is closed.

2. The vehicle finish protection apparatus of claim 1 in which said first and second magnet means each comprise a plurality of discrete spaced-apart magnets.

3. The vehicle finish protection apparatus of claim 1 in which said first and second magnet means each comprise a continuous flexible strip of magnetic material.

4. The vehicle finish protection apparatus of claim 1 in which each of said first and second elongated sections is triangular in cross section and in which said first and second magnet means comprise, respectively, a plurality of discrete spaced-apart magnets fixed to one of the three sides of said first and second elongated sections.

5. The vehicle finish protection apparatus of claim 1 in which each of said first and second elongated sections is triangular in cross section and in which said first and second magnet means comprise, respectively, continuous flexible strips of magnetic material extending along one of the three sides of said first and second elongated sections.

6. The vehicle finish protection apparatus of claim 1 in which said magnets and anti-theft means are disposed on a first surface of said first or second elongated sections and said hinge means joins surfaces of said first and second elongated sections adjacent to said first surface.

7. A vehicle finish protection apparatus comprising an extruded length of resilient flexible, closed cell material selected from the group consisting of polyethylene, urethane, rubber foam, EDPM foam and neoprene foam having a density of about 1.5 to 5.0 pounds per cubic foot and a water absorption value of less than one per cent, said length having a plurality of sections, living hinge means joining said sections, means for releasably securing said material to the side of a motor vehicle, and means for engaging the edge of a vehicle door to prevent removal of said material while the door is closed, said last named means comprising a hook having a double bight.

8. Apparatus of claim 7 wherein the material is polyethylene having a density of about 1.5 to 3.0 pounds per cubic foot.

9. Apparatus of claim 7 wherein said double bight hook is scored between said first and second bights of said double bight hook and adapted to be broken away for adaptation to use in a 2-door vehicle.

10. Apparatus of claim 7 wherein said means for releasably securing said material to the side of a motor vehicle comprises a plurality of magnets.

11. Apparatus of claim 7 comprising attachment means on a first surface of said extrusion and hinge means of surface adjacent to said first surface, whereby a section may be lifted up and away from the vehicle for folding back on a second section of said extrusion for ease of removal.

12. Apparatus of claim 9 wherein said double bight hook is made of a plastic material.

13. Apparatus of claim 1 wherein said resilient, flexible material is a closed cell material having a density of about 1.5 to 5.0 pounds per cubic foot and a water absorption value of less than one percent.

14. Apparatus of claim 13 wherein said resilient, flexible closed cell material is selected from the group consisting of polyethylene, urethane, rubber foam, EDPM foam and neoprene foam.

15. Apparatus of claim 14 wherein said closed cell material is polyethylene.

16. Apparatus of claim 15 wherein said material has a density of about 1.5 to 3.0 pounds per cubic foot.

17. Apparatus of claim 16 wherein said material is polyethylene having a plurality of about 2.0 pounds per cubic foot.

* * * * *